US011360871B1

United States Patent
Farimani et al.

(10) Patent No.: US 11,360,871 B1
(45) Date of Patent: Jun. 14, 2022

(54) AUTOMATIC OPTIMIZATION AND HARDENING OF APPLICATION IMAGES

(71) Applicant: RapidFort, Inc., San Francisco, CA (US)

(72) Inventors: Mehran Farimani, San Francisco, CA (US); Rajeev Thakur, Sunnyvale, CA (US)

(73) Assignee: RapidFort, Inc., San Francisco, CA (US)

( * ) Notice: Subject to any disclaimer, the term of this patent is extended or adjusted under 35 U.S.C. 154(b) by 0 days.

(21) Appl. No.: 17/103,043

(22) Filed: Nov. 24, 2020

(51) Int. Cl.
*G06F 11/00* (2006.01)
*G06F 11/30* (2006.01)
*G06F 11/32* (2006.01)
*G06F 9/54* (2006.01)

(52) U.S. Cl.
CPC ............ *G06F 11/302* (2013.01); *G06F 9/545* (2013.01); *G06F 11/327* (2013.01); *G06F 2201/865* (2013.01)

(58) Field of Classification Search
CPC .. G06F 11/302; G06F 11/327; G06F 11/3612; G06F 11/3636; G06F 9/545; G06F 2201/865
See application file for complete search history.

(56) References Cited

U.S. PATENT DOCUMENTS

| 2020/0125731 A1* | 4/2020 | Benameur | G06F 8/63 |
| 2021/0026949 A1* | 1/2021 | Korotaev | G06F 8/658 |
| 2021/0042638 A1* | 2/2021 | Novotny | G06F 11/3438 |
| 2021/0075794 A1* | 3/2021 | Gazit | H04L 63/102 |

* cited by examiner

*Primary Examiner* — Joseph D Manoskey
(74) *Attorney, Agent, or Firm* — Young Basile Hanlon & MacFarlane, P.C.

(57) ABSTRACT

Computer receives, from within system application comprising application(s) that communicate with operating system(s) (OS), selection of target application. Computer creates stub application for target application that mimics entry and exit points of target application. Computer isolates target application externally to system application. Computer establishes network connection(s) connecting isolated target application and stub application to process communication between isolated target application and system application. Computer generates OS tracing system that logs file and directory accesses of isolated target application. Computer monitors runtime behavior of isolated target application, using logs of OS tracing system, to identify files used by target application. Computer determines set of files not used by target application. Computer hardens the target application by either removing the determined set of files not used by target application or monitoring access to determined set of files and generating alert upon such access.

18 Claims, 7 Drawing Sheets

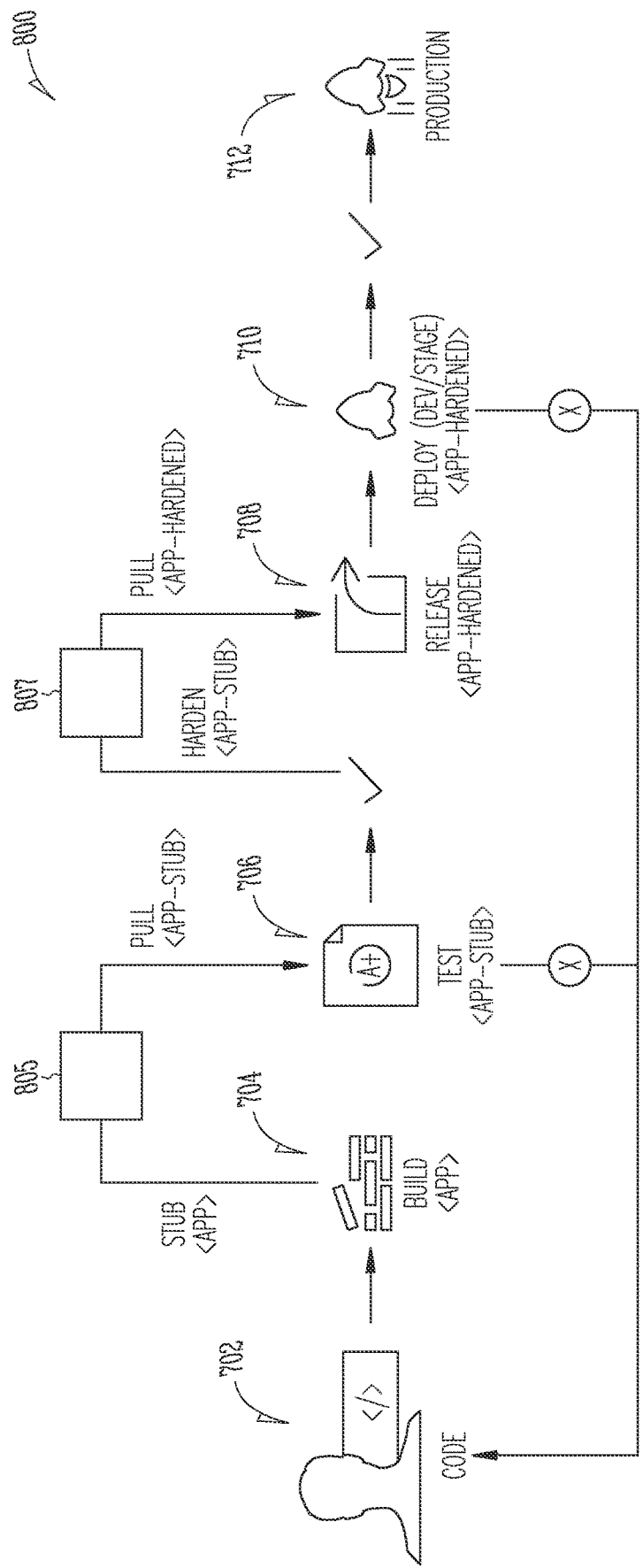

AUTOMATIC OPTIMIZATION AND HARDENING OF APPLICATION IMAGES

TECHNICAL FIELD

Embodiments pertain to computer security. Some embodiments relate to automatic optimization and hardening of application images.

BACKGROUND

In computer programming, a system application may include multiple applications. The applications may include permissions to access many different files, operating system (OS) calls, and/or network ports. These permissions may reduce the security of the applications and the system application. Techniques for making the applications and the system application more secure are desirable.

BRIEF DESCRIPTION OF THE DRAWINGS

FIG. 8 is a flow chart of a second workflow, in accordance with some embodiments.

SUMMARY

Figure 1:
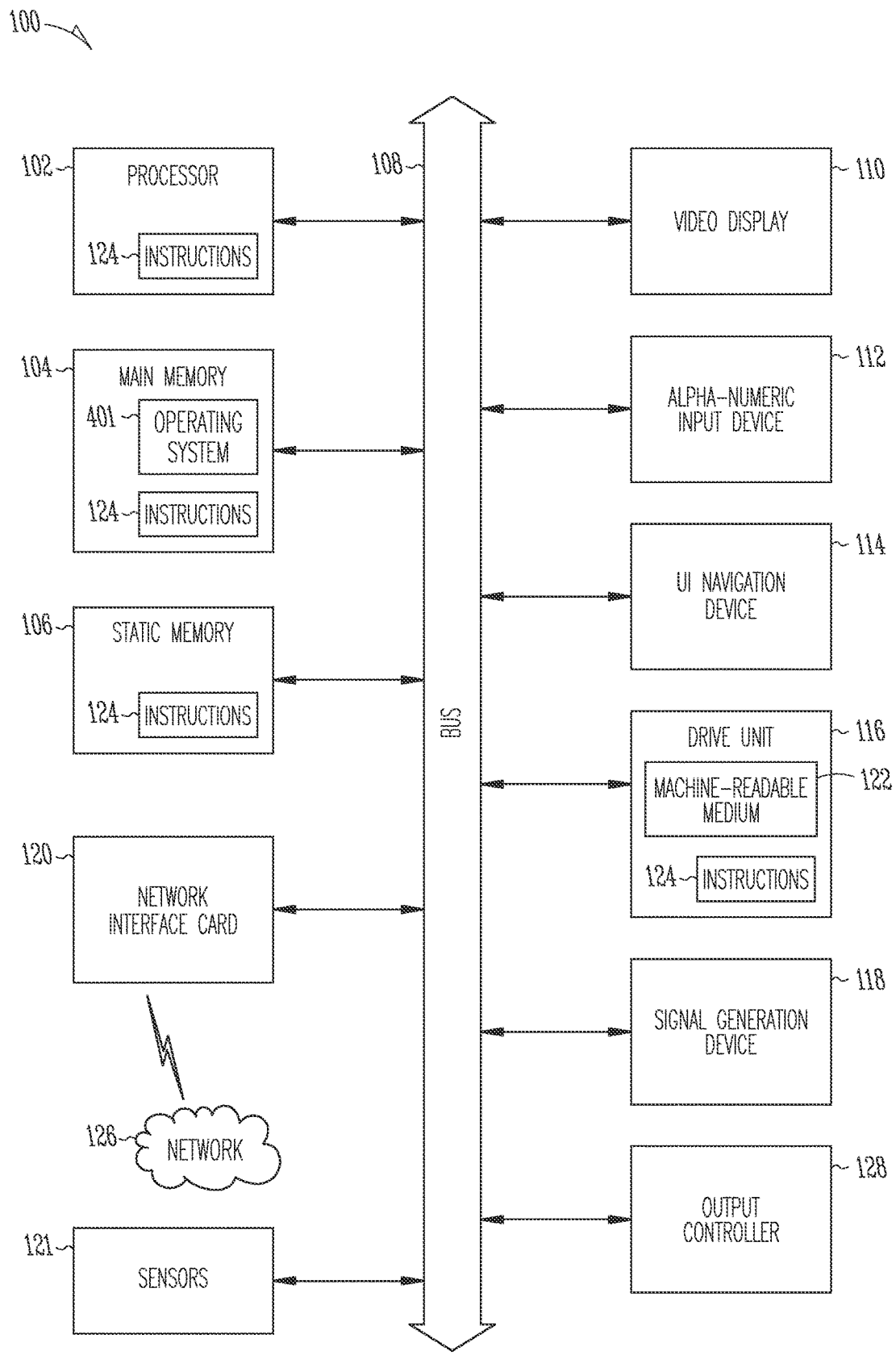
FIG. 1 is a block diagram of a computing machine, in accordance with some embodiments.

The present disclosure generally relates to machines configured to provide computer security, including computerized variants of such special-purpose machines and improvements to such variants. In particular, the present disclosure addresses automatic optimization and hardening of application images.

According to some aspects, a method includes receiving, from within a system application comprising one or more applications that communicate with one or more operating systems (OS), a selection of a target application. The method includes creating a stub application for the target application that mimics entry and exit points of the target application. The method includes isolating the target application externally to the system application. The method includes establishing one or more network connections connecting the isolated target application and the stub application to process communication between the isolated target application and the system application. The stub application mirrors the target application and transmits input/output data between the isolated target application and the system application. The method includes generating an OS tracing system, the OS tracing system logging file and directory accesses of the isolated target application. The method includes monitoring runtime behavior of the isolated target application, using the OS tracing system, to identify files used by the target application to operate. The method includes determining, based on the identified files used by the target application, a set of files not used by the target application. The method includes in response to determining that monitoring of the isolated target application is completed, hardening the target application by either (i) removing the determined set of files not used by the target application or (ii) monitoring access to the determined set of files and generating an alert upon such access. The method includes providing an output representing the hardened target application.

Some aspects include a machine-readable medium storing instructions to perform the above method. Some aspects include a system comprising processing circuitry and memory, the memory storing instructions which, when executed by the processing circuitry, cause the processing circuitry to perform the above method. Some aspects include an apparatus comprising means for performing the above method.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

As used herein, the phrase "operating system (OS)" refers, among other things, to system software that manages computer hardware and software resources and provides common services for computer programs. The operating system may act as an intermediary between the computer programs and the computer hardware. Examples include Linux®, Mac OS X®, and Windows® operating systems.

As used herein, the term "application" refers, among other things, to a collection of computer programs and files that provide OS and application level services and functionalities. Examples of applications include containerized applications (as in Docker® applications for instance), virtual machines (VMs) running enterprise applications, and software that runs on Internet of Things (IoT) devices.

As used herein, the phrase "system application" refers, among other things, to a collection of one or more such applications as defined above that work together to provide a set of desired services and functionalities. Examples include software that runs the finance, e-commerce, sales operations, or human resources (HR) systems in an enterprise.

As used herein, the term "hardening" refers, among other things, to the process of identifying and specifying the sets of files, and/or operating system calls, and/or network ports that an application can be allowed to access and limiting all access outside of this set by i) removing/disallowing some or all of such access and/or ii) generating an alert when some or all of such access is performed.

As used herein, the phrase "target application" refers, among other things, to a specific application within the system application that is selected to be processed for optimization and hardening. Examples include a specific Docker application or a specific VM within the system application.

As used herein, the phrase "isolated target application" refers, among other things, to a copy of the target application that is running externally to the system application.

As used herein, the phrase "stub application" refers, among other things, to an application that is constructed in a way that behaves just like the target application when run within the system application by communicating with the isolated target application over one or more network connections and mimicking its behavior within the system application.

As used herein, the phrase "hardened application" refers, among other things, to an application where any combination of files, OS-level system calls and network ports are removed and/or disallowed, or alternatively access to such files, system calls or network ports are monitored and an alert is generated in the event of access to such files, system calls or network ports.

As used herein, the phrase "computing machine" may include a single computing machine or multiple computing machines performing a set of related tasks. A computing machine may include any device or combination of devices that includes processing circuitry and memory. The processing circuitry and the memory may reside in the same device or in different devices.

As used herein, the phrase "network connection" refers, among other things, to a connection between two software entities over a computer network that provides facilities for exchanging messages between the two software entities.

As used herein, the phrase "interprocess communication" refers, among other things, to mechanisms provided by the operating system that allow sharing of data and messages between applications using the services of the operating system.

As used herein, the phrase "OS tracing system" refers, among other things, to an OS-level tracing system that logs one or both of i) file and directory accesses made by programs and ii) OS-level system calls made by programs.

As used herein, the phrase "network tracing system" refers, among other things, to a tracing system that logs network activities of programs.

As used herein, the phrase "configuration profile" refers, among other things, to a collection of settings to configure a program, an application, an OS, or a system application.

As used herein, the phrase "software package" refers, among other things, to a set of software programs, libraries and files that function as a single entity to accomplish a task or a group of related tasks.

As used herein, the phrase "OS package" refers, among other things, to a software package that extends the core functionality provided by the operating system, suitable for use by many users and types of programs, and is sometimes, but not always, installed using the software installation and management facilities provided by the operating system. Examples include the C runtime library, time zone and locale management tools, and thread management library.

As used herein, the phrase "application package" refers, among other things, to a software package that provides domain-specific functionalities, suitable for use by users and programs to perform specialized tasks, and is sometimes, but not always, installed using software installation and management facilities provided by an application environment framework. Examples include Open Source Python packages for scientific computing, such as NumPy, and Java libraries for web application development such as Spring Boot.

As used herein, the term "vulnerability" refers, among other things, to a defect in a computer system that can leave it open to attack and exploitation by unauthorized users.

As used herein, the phrase "attack surface" refers, among other things, to the sum of the different points where an unauthorized user (the attacker) can try to gain access to a software environment in order to enter data, extract data, or otherwise exploit the resources accessible via the software environment. Keeping the attack surface as small as possible is a security measure.

As discussed above, in computer programming, a system application may include multiple applications. The applications may include permissions to access many different files, OS calls, and/or network ports that are not used by the applications or the system application during their operation. These components and permissions may reduce the security of the applications and the system application, and they may increase the size of the applications and their attack surface. Techniques for making the applications and the system application more secure by minimizing and/or monitoring their attack surface are desirable.

According to some embodiments, a computing machine (or multiple computing machines) receives, from within a system application comprising one or more applications that communicate with one or more operating systems, a selection of a target application. The computing machine creates a stub application based on the target application by identifying all entry points of the target application and mimicking the entry points in the stub application. The computing machine includes programs in the stub application that perform network communication and remote invocation of programs over one or more network connections to the computing machine, where the isolated target application is run. The computing machine includes programs in the stub application that capture the invocation of mimicked entry points in the stub application. The computing machine invokes the corresponding entry points in the isolated target application remotely over the network connections. The computing machine includes programs in the stub application that capture all input to the stub application and relay all such input to the isolated target application over the network connections. The computing machine includes programs in the stub application that capture all network traffic directed to the stub application and relay all such network traffic to the isolated target application over the network connections. The computing machine includes programs in the stub application that receive output of the exit points of the isolated target application, captured by the computing machine, over the network connections and replay all such output to the system application. The computing machine includes programs in the stub application that receive all network traffic produced by the isolated target application and captured by the computing machine. The stub application receives, over the network connections, and replays all such network traffic to the system application. The stub application is run instead of the target application within the system application so that the runtime behavior of the target application can be observed, logged and analyzed.

Upon invocation of a mimicked entry point in the stub application, the stub application establishing one or more network connections with the computing machine if one is not yet established; the computing machine identifying the corresponding isolated target application; the stub application indicating to the computing machine via the network connections invocation of the specific entry point in the isolated target application; the computing machine invoking the specific entry point in the isolated target application as indicated by the stub application; the stub application capturing all or a portion of the input (e.g., from the keyboard, mouse, sensors, incoming interprocess communication, and the like) and network traffic directed to the stub application and transmitting all such input and network traffic to the computing machine over the network connections; the computing machine receiving all such input and network traffic and replaying the input and network traffic to the isolated target application; the computing machine capturing all or a portion of the output (e.g. screen output, outgoing interprocess communication, and the like) of the exit points of the isolated target application and all network traffic produced by the isolated target application and transmitting all such output and network traffic to the stub application over the network connections; and the stub application receiving all such output and network traffic and replaying the output and network traffic to the system application.

Since the input and output activity of the isolated target application is mimicked within the system application via the stub application, the runtime behavior of the isolated target application is concluded to be equivalent to the runtime behavior of the target application running within the system application, specifically as it pertains to file and directory accesses, OS-level system calls, and network activity.

The computing machine and the stub application work together to isolate the target application externally to the system application. The stub application establishes one or more network connections with the computing machine, effectively connecting the isolated target application and the stub application to process input and output between the isolated target application and the system application. The computing machine generates an OS tracing system. The OS tracing system logs file and directory accesses of the isolated target application and logs OS-level system calls that the isolated target application makes. The computing machine monitors the runtime behavior of the isolated target application as the stub application is run within the system application, using OS tracing system's logs, to identify the set of files used by the isolated target application during operation. The computing machine determines, based on the identified set of files used by the isolated target application, a set of files not used by the isolated target application. As explained above, the set of files not used by the isolated target application is deemed to be equivalent to the set of files not used by the target application had it been run instead of the stub application. In response to determining that monitoring of the target application is completed, the computing machine hardens the target application by creating a copy of the target application that (i) excludes some, or all of the determined set of files not used by the target application and (ii) optionally, includes programs in the hardened target application, or creates a configuration profile for the hardened target application, to monitor access to one or more of the determined set of files not used by the target application, and generates alerts upon such access.

According to some embodiments, the computing machine monitors the runtime behavior of the isolated target application as the stub application is run within the system application, using OS tracing system's logs, to identify the set of operating system calls made by the isolated target application during operation. The computing machine determines, based on the identified set of operating system calls made by the isolated target application, a set of operating system calls not used by the isolated target application. As explained above, the set of operating system calls not used by the isolated target application is deemed to be equivalent to the set of operating system calls not used by the target application had it been run instead of the stub application. In response to determining that monitoring of the target application is completed, the computing machine hardens the target application by creating a copy of the target application that (i) optionally, includes programs in the hardened target application, or creates a configuration profile for the hardened target application, to disallow some or all of the determined set of operating system calls not used by the target application and (ii) optionally, includes programs in the hardened target application, or creates a configuration profile for the hardened target application, to monitor calls made to one or more of the determined set of operating system calls not used by the target application, and generates alerts upon such calls made.

According to some embodiments, the computing machine generates a network tracing system. The network tracing system logs all or a portion of the network activity between the isolated target application and the system application. Alternatively, the stub application may generate the network tracing system, transmitting network logs over the network connections to the computing machine for later use. The computing machine monitors the runtime behavior of the isolated target application as the stub application is run within the system application, using network tracing system's logs, to identify the set of network ports used by the isolated target application during operation. The computing machine determines, based on the identified set of network ports used by the isolated target application, a set of network ports not used by the isolated target application. As explained above, the set of network ports not used by the isolated target application is deemed to be equivalent to the set of network ports not used by the target application had it been run instead of the stub application. In response to determining that monitoring of the target application is completed, the computing machine hardens the target application by creating a copy of the target application that (i) optionally, includes programs in the hardened target application, or creates a configuration profile for the hardened target application, to disallow communication over some, or all of the determined set of network ports not used by the target application and (ii) optionally, includes programs in the hardened target application, or creates a configuration profile for the hardened target application, to monitor network activity over one or more of the determined set of network ports not used by the target application, and generates alerts upon such network activity.

In some embodiment, after hardening the target application, the computing machine replaces, within the system application, the target application with the hardened target application.

The technology disclosed herein uses various engines, each of which is constructed, programmed, configured, or otherwise adapted, to carry out a function or set of functions. The term "engine" as used herein may include a tangible device, component, or arrangement of components implemented using hardware, such as by an application specific integrated circuit (ASIC) or field-programmable gate array (FPGA), for example, or as a combination of hardware and software, such as by a processor-based computing platform and a set of program instructions that transform the computing platform into a special-purpose device to implement the particular functionality. An engine may also be implemented as a combination of the two, with certain functions facilitated by hardware alone, and other functions facilitated by a combination of hardware and software.

Throughout this document, some method(s) (e.g., in FIGS. 2, 7, and 8) are described as being implemented serially and in a given order. However, unless explicitly stated otherwise, the operations of the method(s) may be performed in any order. In some cases, two or more operations of the method(s) may be performed in parallel using any known parallel processing techniques. In some cases, some of the operation(s) may be skipped and/or replaced with other operations. Furthermore, skilled persons in the relevant art may recognize other operation(s) that may be performed in conjunction with the operation(s) of the method(s) disclosed herein.

FIG. 1 illustrates a circuit block diagram of a computing machine 100 in accordance with some embodiments. In some embodiments, components of the computing machine 100 may store or be integrated into other components shown in the circuit block diagram of FIG. 1. For example, portions of the computing machine 100 may reside in the processor 102 and may be referred to as "processing circuitry." Processing circuitry may include processing hardware, for example, one or more central processing units (CPUs), one or more graphics processing units (GPUs), and the like. In alternative embodiments, the computing machine 100 may operate as a standalone device or may be connected (e.g., networked) to other computers. In a networked deployment, the computing machine 100 may operate in the capacity of a server, a client, or both in server-client network environments. In an example, the computing machine 100 may act as a peer machine in a peer-to-peer (P2P) (or other distributed) network environment. In this document, the phrases P2P, device-to-device (D2D) and sidelink may be used interchangeably. The computing machine 100 may be a specialized computer, a personal computer (PC), a tablet PC, a personal digital assistant (PDA), a mobile telephone, a smart phone, a web appliance, a network router, switch or bridge, or any machine capable of executing instructions (sequential or otherwise) that specify actions to be taken by that machine.

Examples, as described herein, may include, or may operate on, logic or a number of components, modules, or mechanisms. Modules and components are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems/apparatus (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" (and "component") is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The computing machine 100 may include a hardware processor 102 (e.g., a central processing unit (CPU), a GPU, a hardware processor core, or any combination thereof), a main memory 104 and a static memory 106, some or all of which may communicate with each other via an interlink (e.g., bus) 108. Although not shown, the main memory 104 may contain any or all of removable storage and non-removable storage, volatile memory or non-volatile memory. The computing machine 100 may further include a video display unit 110 (or other display unit), an alphanumeric input device 112 (e.g., a keyboard), and a user interface (UI) navigation device 114 (e.g., a mouse). In an example, the display unit 110, input device 112 and UI navigation device 114 may be a touch screen display. The computing machine 100 may additionally include a storage device (e.g., drive unit) 116, a signal generation device 118 (e.g., a speaker), a network interface device 120, and one or more sensors 121, such as a global positioning system (GPS) sensor, compass, accelerometer, or other sensor. The computing machine 100 may include an output controller 128, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The drive unit 116 (e.g., a storage device) may include a machine readable medium 122 on which is stored one or more sets of data structures or instructions 124 (e.g., software) embodying or utilized by any one or more of the techniques or functions described herein. The instructions 124 may also reside, completely or at least partially, within the main memory 104, within static memory 106, or within the hardware processor 102 during execution thereof by the computing machine 100. In an example, one or any combination of the hardware processor 102, the main memory 104, the static memory 106, or the storage device 116 may constitute machine readable media.

While the machine readable medium 122 is illustrated as a single medium, the term "machine readable medium" may include a single medium or multiple media (e.g., a centralized or distributed database, and/or associated caches and servers) configured to store the one or more instructions 124.

The term "machine readable medium" may include any medium that is capable of storing, encoding, or carrying instructions for execution by the computing machine 100 and that cause the computing machine 100 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 124 may further be transmitted or received over a communications network 126 using a transmission medium via the network interface device 120 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 120 may include one or more physical jacks (e.g., Ethernet, coaxial, or phone jacks) or one or more antennas to connect to the communications network 126.

Figure 2:
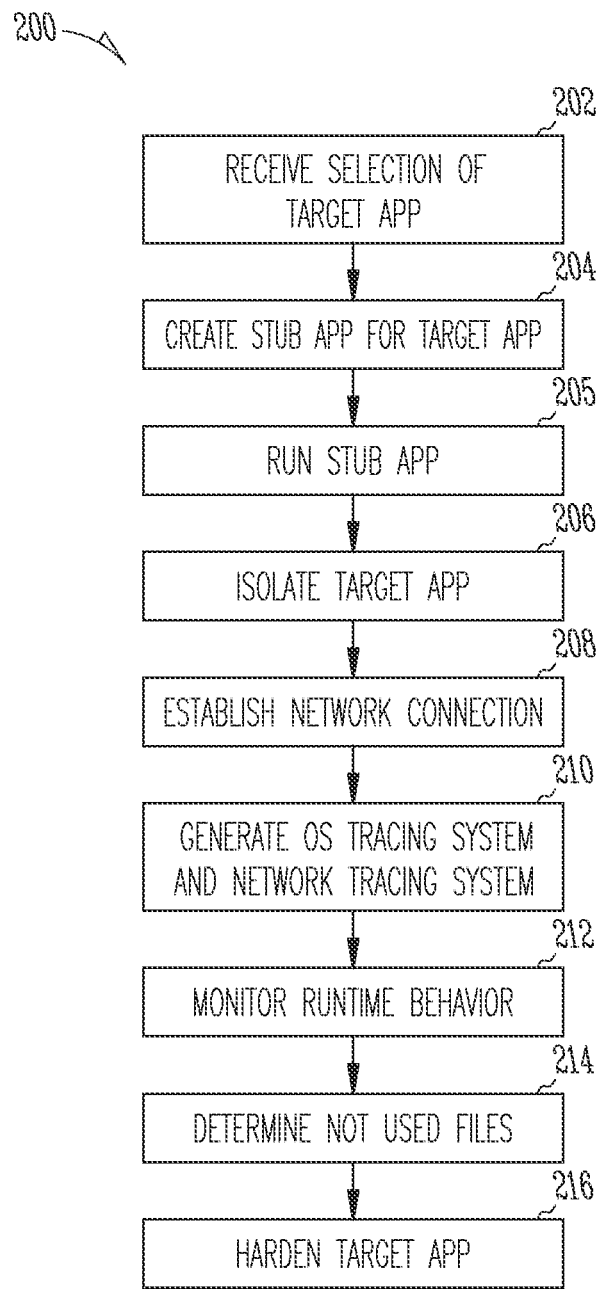
FIG. 2 is a flow chart of a method for application hardening, in accordance with some embodiments.

FIG. 2 is a flow chart of a method 200 for application hardening, in accordance with some embodiments. The method 200 may be implemented at a computing machine, with the stub application running within the system application (see FIG. 4).

At operation 202, the computing machine receives, from within a system application comprising one or more applications, virtual machines, and/or discrete standalone applications that communicate with one or more operating systems, a selection of a target application. The target application may be selected by a user (e.g., a programmer or a tester) or by an automated engine.

At operation 204, the computing machine creates a stub application for the target application by identifying entry points of the target application and mimicking the entry points. The computing machine may generate, based on the file system structure of the target application, a set of directories and files in the stub application.

At operation 205, the stub application is run within the system application, capturing mimicked entry points and signaling to the computing machine to run the isolated target application and the corresponding entry points.

Figure 4:
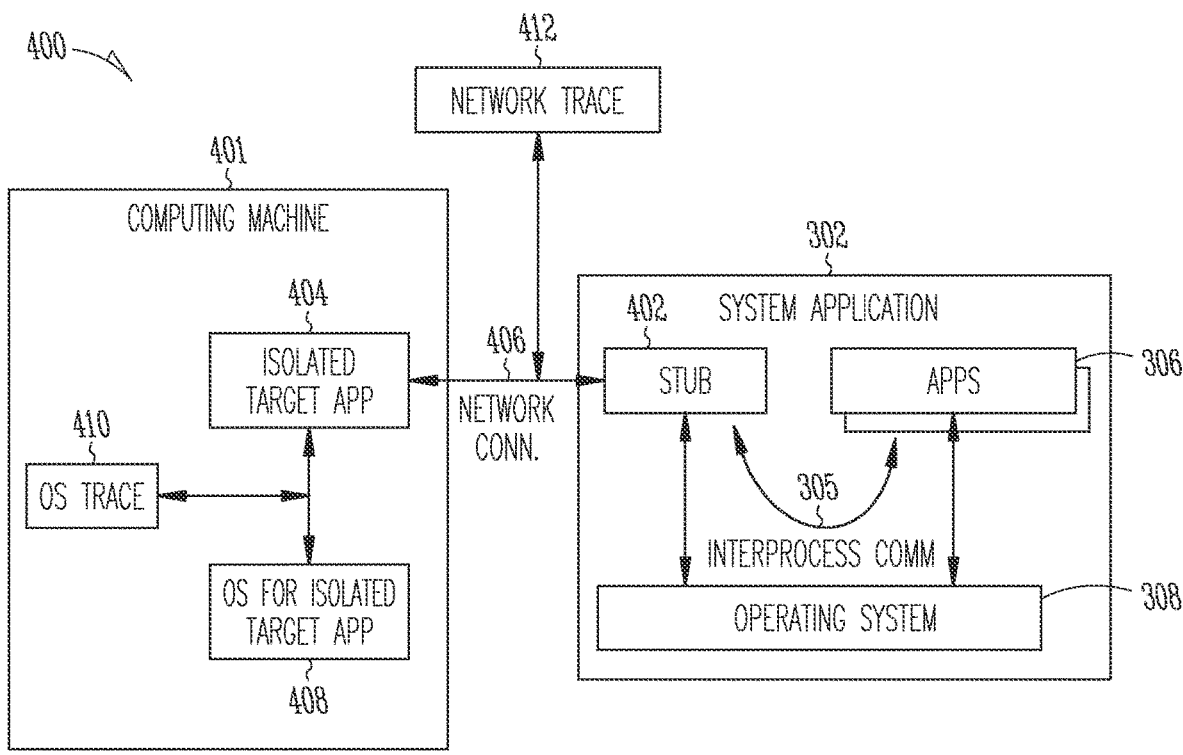
FIG. 4 is a block diagram of a second system in which application hardening may be implemented, in accordance with some embodiments.

At operation 206, the computing machine receives the signal from the stub application and isolates the target application externally to the system application as shown, for example, in FIG. 4.

At operation 208, the stub application establishes one or more network connections to the computing machine, effectively connecting the isolated target application and the stub application to process communication between the isolated target application and the system application.

At operation 210, the computing machine generates an OS tracing system and a network tracing system. The OS tracing system logs system calls that the isolated target application makes to the operating system and logs file and directory accesses of the isolated target application. The network tracing system logs all network activity between the isolated target application and the system application. The network activity may include one or more of traffic statistics, ports, and connection information.

At operation 212, the computing machine monitors the runtime behavior of the isolated target application, using OS tracing system's logs (e.g., associated with the OS tracing system generated in operation 210) to identify a set of files used by the target application to operate. The computing machine observes the runtime behavior of the isolated target application by leveraging the ability of the user to run a plurality of user defined test scripts (or any other manner of intended execution of the target application) against the stub application.

At operation 214, the computing machine determines, based on the identified set of files used by the target application, a set of files not used by the isolated target application. As explained above, the set of files not used by the isolated target application is deemed to be equivalent to the set of files not used by the target application had it been run instead of the stub application.

At operation 216, in response to determining that monitoring of the isolated target application is completed, the computing machine hardens the target application by either (i) removing the determined set of files not used by the target application or (ii) including software in the hardened target application or creating a configuration profile to monitor access to the determined set of files and generating an alert upon such access. The computing machine provides an output representing the hardened target application. In some cases, the computing machine replaces, within the system application, the target application with the hardened target application. This is described in more detail above.

In some embodiments, the computing machine monitors the runtime behavior of the isolated target application, using the OS tracing system's logs and the network tracing system's logs, to identify a set of operating system calls and network ports used by the target application to operate. The computing machine determines, based on the identified operating system calls and the set of network ports used by the isolated target application, a set of operating system calls and network ports not used by the target application. Hardening the target application includes: (i) disallowing the set of OS calls and network ports not used by the target application or (ii) monitoring access to the set of OS calls and network ports and generating an alert upon such access. This is described in more detail above.

In some embodiments, the computing machine identifies a set of OS packages and application packages (as defined above) included in the target application, along with the corresponding list of files used by each package. The computing machine identifies a set of known vulnerabilities against the included OS packages and application packages in the target application. The computing machine determines, based on the set of files used by the target application and the sets of files used by the packages, a set of packages used by the target application. The computing machine determines, based on packages used by the target application, a set of known vulnerabilities remaining in the hardened target application. The computing machine may output a representation of the set of known vulnerabilities for packages that are used by the target application.

The computing machine may compute, for at least a subset of the set of known vulnerabilities in the target application and using a formula, a risk score to estimate risk of unauthorized attack associated with a given vulnerability. The formula may use information from the published vulnerability information such as the severity score of the vulnerability and the impact score of the vulnerability to calculate a risk score. The formula may use statistical techniques or any other methods to calculate the risk score. The formula may use information about what packages are used by the target application, as described above, to enhance the accuracy of the risk estimate provided by the risk score based on whether the vulnerability relates to a package that is in use by the target application. The computing machine may compute, for the target application and based on at least the subset, a target application risk score to estimate risk associated with the target application. The computing machine may compute, for the hardened target application and based on at least the subset, a hardened target application risk score to estimate risk associated with the hardened target application. The computing machine may compute, for at least a portion of the plurality of applications (e.g., including the target application) in the system application, a system application risk score to estimate overall risk associated with the system application. The computing machine may provide a visual output indicating the vulnerability risk scores, the application risk scores, the system application risk score. In some examples, the system application risk score is computed based on risk scores for all or a portion of the plurality of applications.

In some embodiments, the computing machine determines, based on one or more vulnerability databases associated with the target application, that a patch is available for a specified package in the target application. The computing machine determines, based on monitoring the runtime behavior of the target application, whether the specified package is used by the target application. In response to determining that the specified package is used by the target application, the computing machine patches the hardened target application, automatically or upon receiving confirmation from the user. In response to determining that the specified package is not used by the target application, the computing machine forgoes patching the hardened target application.

In some embodiments, the computing machine determines that a set of network ports or operating system calls are not used by the target application. The computing machine identifies, based on the determined set of network ports or operating system calls that are not used by the target application, a list of allowed network ports or operating system calls for use in a configuration profile for the hardened target application. In some embodiments, the computing machine receives, from a user or from an automated software engine, a selection of packages, files, operating system calls, and network ports for acceptance (or, alternatively, rejection) for inclusion in the hardened target application.

Figure 3:
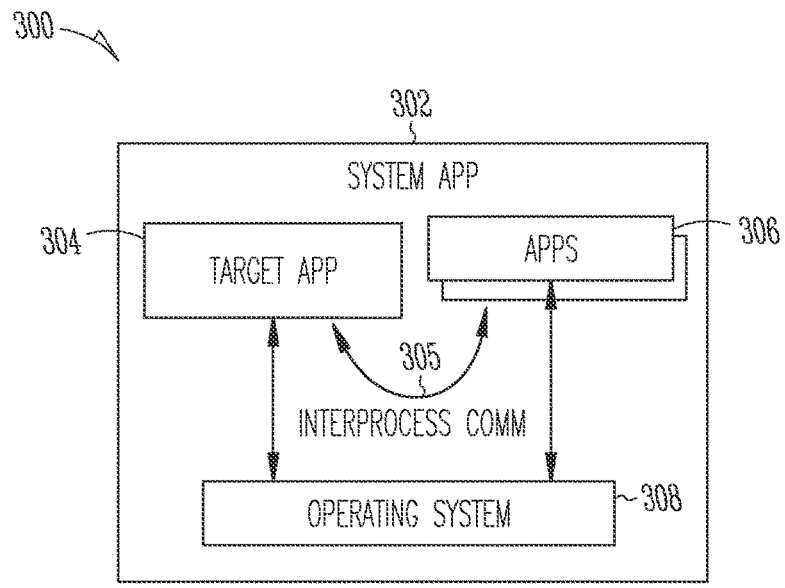
FIG. 3 is a block diagram of a first system in which application hardening may be implemented, in accordance with some embodiments.

FIG. 3 is a block diagram of a first system 300 in which application hardening may be implemented, in accordance with some embodiments. As shown, the system 300 includes a system application (app) 302 which includes an operating system 308. The system application includes multiple applications (apps) 306, including the target application 304. The target application 304 and the other applications 306 communicate with the operating system 308. The applications— including the target application 304 and the other applications 306—communicate with one another using interprocess communication 305. The operating system 308 allocates and provides computational resources (e.g., hardware or software) to the applications 306 and the target application 304. It should be noted that, in some examples, the system application 302 may be replaced with the system application 602 shown in FIG. 6.

FIG. 4 is a block diagram of a second system 400 in which application hardening may be implemented, in accordance with some embodiments.

As shown, the system 400 includes the system application 302 and the operating system 308 from the system 300. The system application 302 includes the applications 306. However, the target application 304 is replaced with a stub application (stub) 402 coupled, via one or more network connections 406, with an isolated target application 404. In some embodiments, some or all of the network connections 406 may be encrypted. The stub application 402 communicates with the operating system 308, and it may communicate with other applications 306 via interprocess communication 305. The stub application 402 mimics all entry points of target application 304, and is able to access interprocess communication 305, network interfaces, input and output devices, the operating system 308, and the like, which the target application 304 is able to access. The isolated target application 404 is a copy of the target application 304. However, all of its input, output, network traffic, interprocess communication(s), and the like are mirrored by the stub application 402 over the network connection 406 with the help of the computing machine 401. Calls to the operating system 408 and file accesses for the isolated target application 404 are recorded using the OS trace 410. Information about network activity between the isolated target application 404 and the system application 302 is recorded using the network trace 412. The network trace 412 may be implemented in the computing machine 401, or in the stub application 402 and sent to the computing machine 401.

Figure 5:
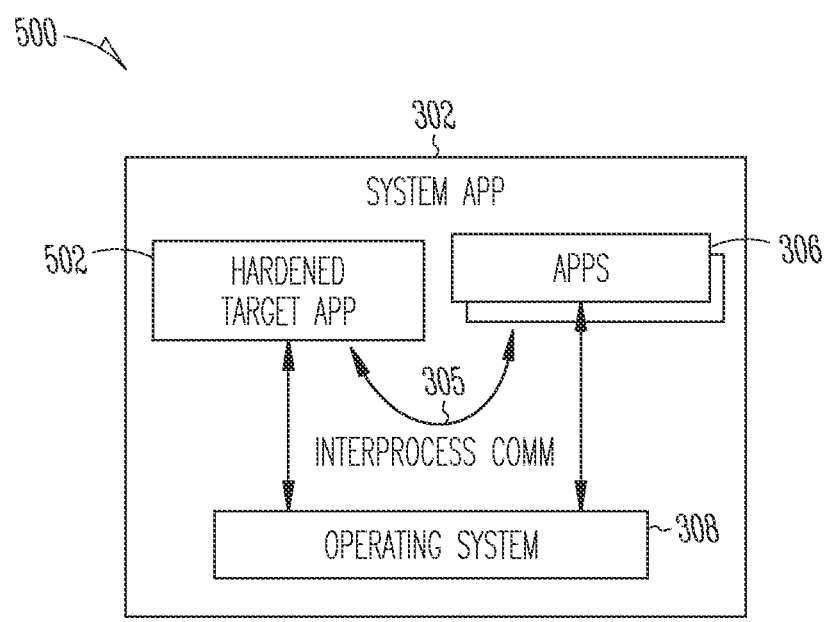
FIG. 5 is a block diagram of a third system in which application hardening may be implemented, in accordance with some embodiments.

FIG. 5 is a block diagram of a third system 500 in which application hardening may be implemented, in accordance with some embodiments. As shown, the system 500 includes the system application 302 (including the applications 306 and the operating system 308) from the system 300. As shown, within the system application 302, the target application 304 of the system 300 is replaced with a hardened target application 502. The applications 306 and the hardened target application 502 may communicate with one another using interprocess communication 305.

Using the system 400 shown in FIG. 4, the computing machine 401 may determine which files, OS calls, network activity, and the like are used and are not used by the target application 304. The computing machine 401, via the system 400, may generate the hardened target application 502 that lacks access to the files, OS calls, network activity, and the like that are not used by the target application 304, or such access might be monitored and result in an alert being generated. The hardened target application 502 is more secure than the target application 304 because it lacks access, or generates alerts upon access, to those files, OS calls, network activity, while still being able to operate.

Figure 6:
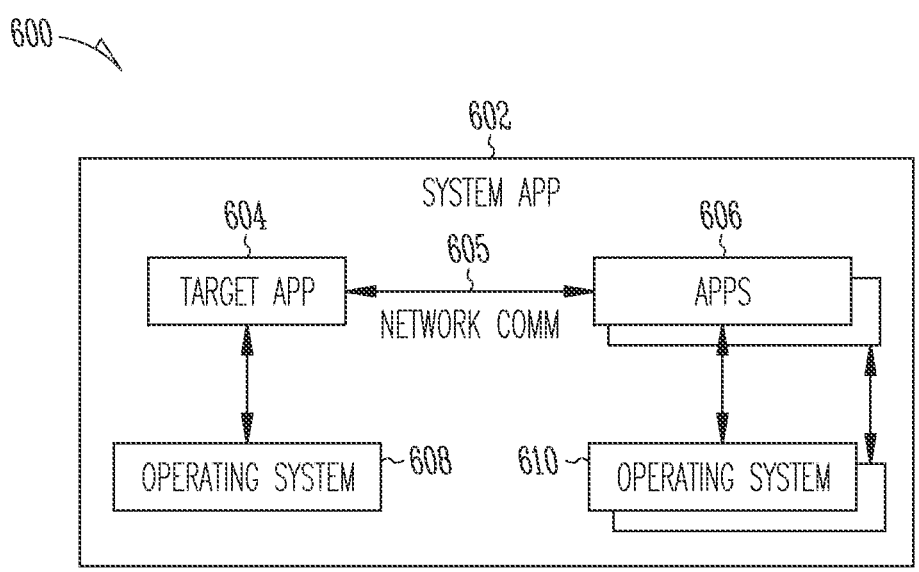
FIG. 6 is a block diagram of a fourth system in which application hardening may be implemented, in accordance with some embodiments.

FIG. 6 is a block diagram of a fourth system 600 in which application hardening may be implemented, in accordance with some embodiments. As shown, the system 600 includes a system application 602 including operating system 608 and one or more other operating systems 610, where 610 represents a plurality of operating systems providing services to different combinations of applications 606. The operating system 608 provides services to the target application 604. The system application includes multiple applications 606 and the target application 604. The target application 604 and the other applications 606 communicate with their respective operating systems 608 and 610, and they may communicate with each other using network communication 605. The operating systems 608 and 610 allocate and provide computational resources (e.g., hardware or software) to their respective applications 604 and 606. It should be noted that, in some examples, the system application 302 (as shown in FIGS. 3, 4, and 5) may be replaced with the system application 602 shown in FIG. 6.

Figure 7:
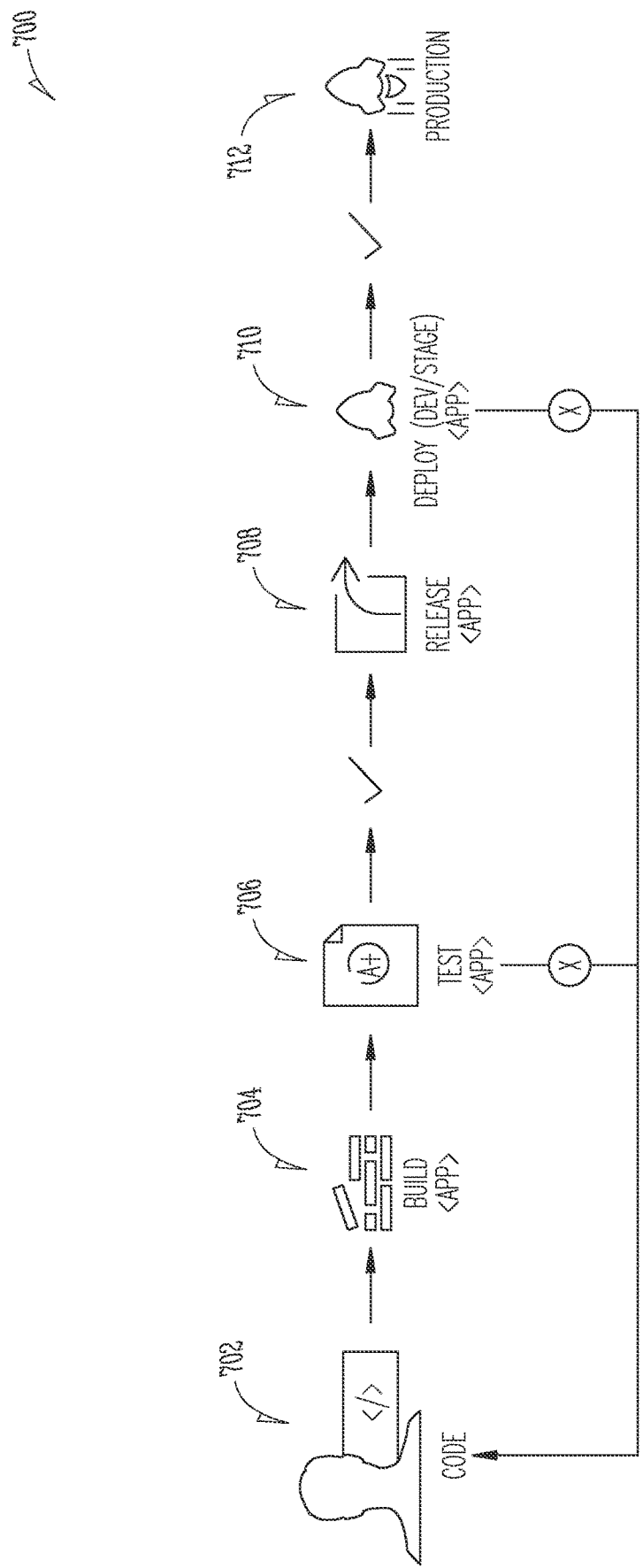
FIG. 7 is a flow chart of a first workflow, in accordance with some embodiments.

FIG. 7 is a flow chart of a first workflow 700, in accordance with some embodiments.

At block 702, code is generated, for example, by a computer programmer, a team of programmers, or automatically using an artificial intelligence system.

At block 704, an application is built.

At block 706, the application is tested. Based on the results of the testing, the workflow 700 may continue to block 708 (e.g., if the code is operating properly) or return to block 702 (e.g., if the code is not operating properly).

At block 708, the application is released.

At block 710, the application is deployed. Based on the success of the deployment, the workflow 700 may continue to block 712 (e.g., if the deployment is successful) or return to block 702 (e.g., if failures are observed in the deployment).

At block 712, the code is placed into production.

FIG. 8 is a flow chart of a second workflow 800, in accordance with some embodiments. As shown, the workflow 800 includes the blocks 702-1012 from the workflow 700. In addition, block 805 is added between block 704 and block 706, and block 807 is added between block 706 and block 708.

At block 805, the application (built at block 704) is sent to the computing machine and the stub application is generated, as described earlier. At block 706, the stub application generated at block 805 is pulled and run instead of the application built at block 704 for testing purposes.

Upon successful completion of tests at block 706, a signal is sent to the computing machine, and at block 807, the tested application from block 704 is hardened. Block 708 pulls the hardened application from block 807.

Different embodiments can make changes to the features described above. For example, instead of using the stub application 402, the target application 304 can run within the system application 302 and its network communication(s), interprocess communication(s), OS communication(s), input(s), output(s), and the like may be monitored to identify files, OS calls, network ports, and the like that are used and not used by the target application 304. The hardened target application 502 may be generated based on the used and not used files, OS calls, network ports, and the like using the techniques described above, but with monitoring the target application 304 directly instead of monitoring the isolated target application 404 using the stub application 402.

In some embodiments, the stub application 402 may be run multiple times in different runtime scenarios to identify as many as possible of the used and not used files, OS calls, network ports, and the like. For example, if the target application 304 is associated with ecommerce, the stub application 402 may be run when the ecommerce system is operating normally, when the ecommerce system is overloaded (e.g., on Black Friday or the weekend before Christmas), and when large amounts of new merchandise descriptions are added to the ecommerce system.

Some embodiments are described below as numbered examples (Example 1, 2, 3 . . . ). These examples are provided as examples only and do not limit the disclosed technology.

Example 1 is a method comprising: receiving, from within a system application comprising one or more applications that communicate with one or more operating systems (OS), a selection of a target application; creating a stub application for the target application that mimics entry and exit points of the target application; isolating the target application externally to the system application; establishing one or more network connections connecting the isolated target application and the stub application to process communication between the isolated target application and the system application, wherein the stub application mirrors the target application and transmits input/output data between the isolated target application and the system application, generating an OS tracing system, the OS tracing system logging file and directory accesses of the isolated target application; monitoring runtime behavior of the isolated target application, using logs of the OS tracing system, to identify files used by the target application to operate; determining, based on the identified files used by the target application, a set of files not used by the target application; in response to determining that monitoring of the isolated target application is completed, hardening the target application by either (i) removing the determined set of files not used by the target application or (ii) monitoring access to the determined set of files and generating an alert upon such access; and providing an output representing the hardened target application.

In Example 2, the subject matter of Example 1 includes, monitoring the runtime behavior of the target application, using the logs of the OS tracing system, to identify a set of OS calls used by the target application to operate; determining, based on the identified operating system calls used by the target application, a set of OS calls not used by the target application, wherein hardening the target application further comprises: (i) disallowing the set of OS calls not used by the target application or (ii) monitoring access to the set of OS calls and generating an alert upon such access.

In Example 3, the subject matter of Examples 1-2 includes, generating a network tracing system, the network tracing system logging network activity between the isolated target application and the system application; monitoring the runtime behavior of the isolated target application, using logs of the network tracing system, to identify network ports used by the target application for network communication; determining, based on the identified network ports used by the target application, a set of network ports not used by the target application for network communication, wherein hardening the target application further comprises (i) disallowing communication over the set of network ports not used by the target application or (ii) monitoring access to the set of network ports and generating an alert upon such access.

In Example 4, the subject matter of Examples 1-3 includes, replacing, within the system application, the target application with the hardened target application.

In Example 5, the subject matter of Examples 1-4 includes, identifying a set of OS packages and application packages included in the target application, along with the corresponding list of files used by each package; and identifying a set of known vulnerabilities against the included OS packages and application packages included in the target application; and determining, based on the files used by the target application, a set of packages used by the target application; and determining, based on packages used by the target application, a set of known vulnerabilities for packages used in the target application, and a set of known vulnerabilities for packages not used in the target application, and a set of known vulnerabilities in the hardened target application.

In Example 6, the subject matter of Example 5 includes, computing, for at least a subset of the set of known vulnerabilities in the target application, an individual vulnerability risk score for each vulnerability; computing, for the target application and based on the at least the subset, a target application risk score; computing, for the hardened target application and based on the at least the subset, a hardened target application risk score; computing, based on least a portion of the plurality of applications in the system application, a system application risk score; and providing a visual output indicating the individual vulnerability risk score for each vulnerability, the t application risk scores, and the system application risk score.

In Example 7, the subject matter of Examples 1-6 includes, determining, based on one or more vulnerabilities databases associated with the target application, that a patch is available for a specified package in the target application; determining, based on monitoring the runtime behavior of the target application, whether the specified package is used by the target application; and in response to determining that the specified package is used by the target application: patching the target application and/or the hardened target application.

In Example 8, the subject matter of Example 7 includes, in response to determining that the specified package is not used by the target application: foregoing patching the target application and/or the hardened target application.

In Example 9, the subject matter of Examples 1-8 includes, determining that a set of network ports are not used by the target application; and identifying, based on the determined set of network ports that are not used by the target application, a list of allowed network ports for use in a configuration profile for the hardened target application.

In Example 10, the subject matter of Examples 1-9 includes, determining that a set of operating system calls are not used by the target application; and identifying, based on the determined set of operating system calls that are not used by the target application, a list of allowed or operating system calls for use in a configuration profile for the hardened target application.

In Example 11, the subject matter of Examples 1-10 includes, receiving, from a user or from an automated software engine, a selection of packages, files, operating system calls, and network ports for acceptance or rejection for inclusion in the hardened target application.

Example 12 is at least one machine-readable medium including instructions that, when executed by processing circuitry, cause the processing circuitry to perform operations to implement any of Examples 1-11.

Example 13 is an apparatus comprising means to implement any of Examples 1-11.

Example 14 is a system to implement any of Examples 1-11.

Example 15 is a method to implement any of Examples 1-11.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, user equipment (UE), article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:
    receiving, from within a system application comprising one or more applications that communicate with one or more operating systems (OS), a selection of a target application;
    creating a stub application for the target application that mimics entry and exit points of the target application;
    isolating the target application externally to the system application;
    establishing one or more network connections connecting the isolated target application and the stub application to process communication between the isolated target application and the system application, wherein the stub application mirrors the target application and transmits input/output data between the isolated target application and the system application;
    generating an OS tracing system, the OS tracing system logging file and directory accesses of the isolated target application;
    monitoring runtime behavior of the isolated target application, using logs of the OS tracing system, to identify files used by the target application to operate;
    determining, based on the identified files used by the target application, a set of files not used by the target application;
    in response to determining that monitoring of the isolated target application is completed, hardening the target application by either (i) removing the determined set of files not used by the target application or (ii) monitoring access to the determined set of files and generating an alert upon such access;

providing an output representing the hardened target application;

generating a network tracing system, the network tracing system logging network activity between the isolated target application and the system application;

monitoring the runtime behavior of the isolated target application, using logs of the network tracing system, to identify network ports used by the target application for network communication; and determining, based on the identified network ports used by the target application, a set of network ports not used by the target application for network communication, wherein hardening the target application further comprises (i) disallowing communication over the set of network ports not used by the target application or (ii) monitoring access to the set of network ports and generating an alert upon such access.

2. The method of claim 1, further comprising:
monitoring the runtime behavior of the target application, using the logs of the OS tracing system, to identify a set of OS calls used by the target application to operate; and determining, based on the identified operating system calls used by the target application, a set of OS calls not used by the target application, wherein hardening the target application further comprises: (i) disallowing the set of OS calls not used by the target application or (ii) monitoring access to the set of OS calls and generating an alert upon such access.

3. The method of claim 1, further comprising:
replacing, within the system application, the target application with the hardened target application.

4. The method of claim 1, further comprising:
identifying a set of OS packages and application packages included in the target application, along with the corresponding list of files used by each package; and identifying a set of known vulnerabilities against the OS packages and application packages included in the target application; and determining, based on the files used by the target application, a set of packages used by the target application; and determining, based on packages used by the target application, a set of known vulnerabilities for packages used in the target application, and a set of known vulnerabilities for packages not used in the target application, and a set of known vulnerabilities in the hardened target application.

5. The method of claim 4, further comprising:
computing, for at least a subset of the set of known vulnerabilities in the target application, an individual vulnerability risk score for each vulnerability;

computing, for the target application and based on the at least the subset, a target application risk score;

computing, based on least a portion of the plurality of applications in the system application, a system application risk score; and providing a visual output indicating the individual vulnerability risk score for each vulnerability, the target application risk score, and the system application risk score.

6. The methods of claim 1, further comprising:
determining, based on one or more vulnerability databases associated with the target application, that a patch is available for a specified package in the target application;

determining, based on monitoring the runtime behavior of the target application, whether the specified package is used by the target application; and in response to determining that the specified package is used by the target application: patching the target application and/or the hardened target application.

7. The method of claim 6, further comprising:
in response to determining that the specified package is not used by the target application: foregoing patching the target application and/or the hardened target application.

8. The method of claim 1, further comprising:
determining that a set of network ports are not used by the target application; and identifying, based on the determined set of network pons that are not used by the target application, a list of allowed network ports for use in a configuration profile for the hardened target application.

9. The method of claim 1, further comprising:
determining that a set of operating system calls are not used by the target application; and identifying, based on the determined set of operating system calls that are not used by the target application, a list of allowed or operating system calls for use in a configuration profile for the hardened target application.

10. The method of claim 1, further comprising:
receiving, from a user or from an automated software engine, a selection of packages, files, operating system calls, and network ports for acceptance or rejection for inclusion in the hardened target application.

11. A non-transitory machine-readable medium storing instructions which, when executed by one or more computing machines, cause the one or more computing machines to perform operations comprising:

receiving, from within a system application comprising one or more applications that communicate with one or more operating systems (OS), a selection of a target application;

creating a stub application for the target application that mimics entry and exit points of the target application;

isolating the target application externally to the system application;

establishing one or more network connections connecting the isolated target application and the stub application to process communication between the isolated target application and the system application, wherein the stub application mirrors the target application and transmits input/output data between the isolated target application and the system application;

generating an OS tracing system, the OS tracing system logging file and directory accesses of the isolated target application;

monitoring runtime behavior of the isolated target application, using logs of the OS tracing system, to identify files used by the target application to operate;

determining, based on the identified files used by the target application, a set of files not used by the target application;

in response to determining that monitoring of the isolated target application is completed, hardening the target application by either (i) removing the determined set of files not used by the target application or (ii) monitoring access to the determined set of files and generating an alert upon such access;

providing an output representing the hardened target application;

identifying a set of OS packages and application packages included in the target application, along with the corresponding list of files used by each package; and identifying a set of known vulnerabilities against the OS packages and application packages included in the target application; and determining, based on the files used by the target application, a set of packages used by the target application; and determining, based on packages used by the target application, a set of known vulnerabilities for packages used in the target application, and a set of known vulnerabilities for packages not used in the target application, and a set of known vulnerabilities in the hardened target application.

12. The machine-readable medium of claim 11, the operations further comprising:

monitoring the runtime behavior of the target application, using the logs of the OS tracing system, to identify a set of OS calls used by the target application to operate; and determining, based on the identified operating system calls used by the target application, a set of OS calls not used by the target application, wherein hardening the target application further comprises: (i) disallowing the set of OS calls not used by the target application or (ii) monitoring access to the set of OS calls and generating an alert upon such access.

13. The machine-readable medium of claim 11, the operations further comprising:

generating a network tracing system, the network tracing system logging network activity between the isolated target application and the system application;

monitoring the runtime behavior of the isolated target application, using logs of the network tracing system, to identify network ports used by the target application for network communication; and determining, based on the identified network ports used by the target application, a set of network ports not used by the target application for network communication, wherein hardening the target application further comprises (i) disallowing communication over the set of network ports not used by the target application or (ii) monitoring access to the set of network ports and generating an alert upon such access.

14. The machine-readable medium of claim 11, the operations further comprising:

replacing, within the system application, the target application with the hardened target application.

15. The machine-readable medium of claim 11, the operations further comprising:

computing, for at least a subset of the set of known vulnerabilities in the target application, an individual vulnerability risk score for each vulnerability;

computing, for the target application and based on the at least the subset, a target application risk score;

computing, based on least a portion of the plurality of applications in the system application, a system application risk score; and providing a visual output indicating the individual vulnerability risk score for each vulnerability, the target application risk score, and the system application risk score.

16. The machine-readable medium of claim 11, the operations further comprising:

determining, based on one or more vulnerability databases associated with the target application, that a patch is available for a specified package in the target application;

determining, based on monitoring the runtime behavior of the target application, whether the specified package is used by the target application; and in response to determining that the specified package is used by the target application: patching the target application and/or the hardened target application.

17. The machine-readable medium of claim 16, the operations further comprising:

in response to determining that the specified package is not used by the target application: foregoing patching the target application and/or the hardened target application.

18. An apparatus comprising:

processing circuitry; and a memory storing instructions which, when executed by the processing circuitry, cause the processing circuitry to perform operations comprising:

receiving, from within a system application comprising one or more applications that communicate with one or more operating systems (OS), a selection of a target application;

creating a stub application for the target application that mimics entry and exit points of the target application;

isolating the target application externally to the system application;

establishing one or more network connections connecting the isolated target application and the stub application to process communication between the isolated target application and the system application, wherein the stub application mirrors the target application and transmits input/output data between the mimicked entry and exit points and the isolated target application;

generating an OS tracing system, the OS tracing system logging file and directory accesses of the isolated target application;

monitoring runtime behavior of the isolated target application, using logs of the OS tracing system, to identify files used by the target application to operate;

determining, based on the identified files used by the target application, a set of files not used by the target application;

in response to determining that monitoring of the isolated target application is completed, hardening the target application by either (i) removing the determined set of files not used by the target application or (ii) monitoring access to the determined set of files and generating an alert upon such access;

providing an output representing the hardened target application;

determining that a set of network ports are not used by the target application; and identifying, based on the determined set of network pons that are not used by the target application, a list of allowed network ports for use in a configuration profile for the hardened target application.

\* \* \* \* \*